Patented Aug. 26, 1952

2,608,489

UNITED STATES PATENT OFFICE 2,608,489

SYNERGISTICALLY SWEETENED CANNED FRUITS AND METHODS OF MAKING THE SAME

Henry Wayne Walker, McHenry, Ill., assignor to Ditex Foods, Inc., Chicago, Ill., a corporation of Illinois No Drawing. Application November 9, 1951, Serial No. 255,734

13 Claims. (Cl. 99—186)

The present invention relates to synergistically sweetened canned fruits and methods of making the same.

A significant and constantly increasing proportion of our population must or should restrict their intake of calories, and particularly of ordinary carbohydrates. Many of these people are under doctors' orders not to eat foods prepared with ordinary sugars. This has the effect of depriving such persons of ordinary canned fruits, among other items of the diet. Unless adequate and palatable substitutes are available, such persons may ingest an inadequate supply of vitamins, minerals, and other food constituents characteristic of fruits. Furthermore, such persons often exhibit a more or less uncontrollable craving for sweets, so that they are unable to abide by their diets unless provided with sweet tasting substances not sweetened with the ordinary sugars, sucrose and dextrose.

It is of course old to artifically sweeten foods with saccharin, and it is well settled that saccharin is safe for such use. Unfortunately, saccharin not only imparts a sweet taste, but also a bitter after-taste, the perceptibility of which varies markedly from individual to individual, but which is so distinct as to be definitely unpleasant to most people when the saccharin is in the food in concentrations greater than about 0.01%. Furthermore, most canned fruits artificially sweetened with saccharin become bitter on standing or on cooking. Cooking saccharin products is generally believed to result in diminution of the sweetness and increase in the metallic by-taste thereof.

It is possible to inhibit the disagreeable taste of saccharin in canned fruits by incorporating relatively large proportions of added pectin with the saccharin. But such dietetic canned fruits have the disadvantages that the added pectin has little real food value, and substantial quantities of saccharin must be used to obtain a satisfactorily sweet taste. Such pectin-inhibited canned fruits typically contain about 0.03% or 0.04% saccharin.

I have discovered a most surprising synergistic action which makes it possible to eliminate altogether the use of added pectin to inhibit the undesirable taste of saccharin, and at the same time reduce the concentration of saccharin to one-third or less of that formerly used, and still obtain the same degree of sweetness.

Sorbitol, also known as hexitol, is utilized in the human body as carbohydrate, only more slowly. It has only negligible sweetening power. But when canned fruits are sweetened with a mixture of sorbitol and saccharin, the added sweet taste thereby imparted is several fold the sweetening provided by the saccharin in the absence of the sorbitol. Thus, by the practice of my invention, canned fruits are obtained containing only a fraction of the saccharin formerly used, and yet equalling these prior products in sweetness and surpassing them in palatability.

I have discovered, further, that the liquid portion of my synergistically sweetened canned fruits may be thickened to the same consistency as that of conventional sugar sweetened canned fruits, by the incorporation of carboxymethylcellulose, without any alteration in the synergistic coaction of the saccharin and the sorbitol in producing heightened taste effect of sweetness.

No shelf aging is needed to develop the synergistic action, or to complete the inhibition of the undesirable after-taste of the saccharin. All the desirable properties of the canned product are present therein when the cans leave the canning line.

Accordingly, it is a principal object of the present invention to provide saccharin-sweetened canned foods free of any undesirable saccharin after-taste and exhibiting a sweet taste notably in excess of that obtainable from the added saccharin alone, due to the synergistic action of sorbitol incorporated with the saccharin.

Another principal object is to provide practical methods of making canned fruits of desirable sweetness, without adding sucrose or dextrose thereto, and using only a fraction of the saccharin previously necessary for this purpose. Still another object is to provide saccharin sweetened canned fruits which do not deteriorate in sweetness as a result of processing or subsequent cooking, and which do not develop any metallic by-taste as a result of being cooked.

As used in this specification and the appended claims, the term saccharin includes both ordinary saccharin

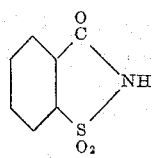

and soluble saccharin (saccharin sodium)

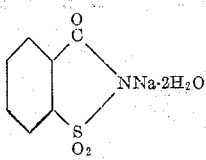

The term "canned" herein means sealed in a container after processing by heat to prevent spoilage, regardless whether the container is a tin can, a bottle, or any other hermetically sealed enclosure.

The objectives of my invention are achieved by incorporating in canned fruits saccharin in the proportion of 0.004% to 0.020%, preferably in the neighborhood of 0.01% to 0.015%, and sorbitol in proportions of the order of magnitude of about one hundred times the saccharin content, the invention being operative when the ratio of saccharin to sorbitol is between 1:50 and 1:400.

The synergistically sweetened canned fruits of the present invention are now being manufactured and sold on a substantial commercial scale; and they have achieved widespread consumer acceptance. The commercial varieties which I have already placed upon the market include sliced yellow cling peaches, Bartlett pears, prune plums, fruit cocktail, apricots, light sweet cherries and dark sweet cherries, as well as apricot nectar.

In order more fully to disclose the invention and the details of manufacture in connection therewith, the following examples are recited by way of illustration and not of limitation. These examples all state the put in recipe for the commercial 8 ounce can.

Advantageously, the sorbitol may be used in the form of commercial sorbitol syrup, containing 70 per cent by weight of d-sorbitol solids and 30 per cent water. The saccharin is most conveniently added to the warm sorbitol syrup at the time the manufacture of the latter is completed. The saccharin may be added to the sorbitol syrup in the proportion of from ¾ grain to 5 grains of saccharin to 1 fluid ounce sorbitol syrup. I generally add 3 grains of soluble saccharin (saccharin sodium) to each fluid ounce of sorbitol syrup.

When it is desired that the liquid packing medium of the canned fruit have a viscosity simulating that of ordinary sugar-packed canned fruits, I also incorporate carboxymethylcellulose in the form of an aqueous dispersion containing from about 1.5 grams to about 4.5 grams of carboxymethylcellulose to the quart of aqueous dispersion.

In commercial operation, the sorbitol, saccharin, carboxymethylcellulose and water are all combined to make the filling medium, as for example, by working the aqueous dispersion of carboxymethylcellulose into the synergistic syrup comprising the saccharin dissolved or dispersed in the sorbitol syrup.

EXAMPLE I

Canned sliced yellow cling peaches

Peeled sliced peaches are filled into cans, and the cans are then completely filled with liquid packing medium. The filled cans are exhausted by heating in accordance with conventional canning practice until a closing center temperature of 160° to 170° F. is attained; the container is then hermetically sealed, as for example by the usual double seaming operation, and processed by heating so as to prevent spoilage, typically for 20 to 30 minutes at 212° F. in a continuous agitating cooker.

Alternatively, the Judd system of packing may be used, according to which a portion of the liquid fill space is filled with a relatively heavier solution of sorbitol, saccharin, and carboxymethylcellulose, and then the balance of the liquid fill space is filled with ordinary water, in order to avoid overflow and spillage of the prepared syrup. For example, this prepared syrup might be made up to a concentration about 165% of that desired in the final liquid packing medium, and about 60% of the liquid fill of the can might be filled with this solution. Thereafter, the can would be completely filled with water, and then processed in the conventional way.

The finished container shows from 10 to 15 inches vacuum at room temperature; the fruit therein possesses the color and texture typical of ordinary commercial canned sliced peaches; the packing medium corresponds in consistency to the syrup in ordinary commercial canned sliced peaches; and both the fruit and the liquid packing medium correspond in sweetness to ordinary commercial canned sliced peaches; and are free and remain free of bitter by-taste and bitter after-taste.

A typical run of my synergistically sweetened canned sliced peaches was manufactured according to the following put in recipe, per 8 ounce size can:

| Ingredient | Weight in Grams | Percent by Weight |
|---|---|---|
| Sliced peaches | 174.919 | 70.19 |
| Carboxymethylcellulose | .2300 | .0923 |
| Saccharin | .0324 | .0130 |
| Sorbitol solids | 3.3070 | 1.3271 |
| Water added | 70.7076 | 28.3743 |
| Total fill | 249.196 | 100. |

The procedures described in connection with Example I may be used for the manufacture of a wide variety of different synergistically sweetened canned fruits in a wide variety of forms, such as cubes, pieces, halves, or whole fruit. The proportion of saccharin of course may be varied to suit the taste; the proportion of sorbitol being adjusted to maintain the ratio of saccharin to sorbitol within the limits previously mentioned. The proportion of carboxymethylcellulose of course, may be increased where it is desired to have a packing medium of greater viscosity, decreased where it is desired to have a lesser viscosity, and eliminated altogether if it is desired to have the consistency of the packing medium approximate that of water.

EXAMPLE II

Canned Bartlett pear halves
PUT IN RECIPE

| Ingredient | Weight in Grams | Percent by Weight |
|---|---|---|
| Bartlett pears | 154.507 | 61.10 |
| Carboxymethylcellulose | .3613 | .1429 |
| Saccharin | .0309 | .0122 |
| Sorbitol solids | 3.3075 | 1.3079 |
| Water added | 94.6748 | 37.4383 |
| Total fill | 249.196 | 100. |

EXAMPLE III

Canned prune plums
PUT IN RECIPE

| Ingredient | Weight in Grams | Percent by Weight |
|---|---|---|
| Prune plums | 123.3225 | 52.0958 |
| Carboxymethylcellulose | .4238 | .1790 |
| Saccharin | .0243 | .0103 |
| Sorbitol solids | 2.4805 | 1.0479 |
| Water added | 110.4714 | 46.6670 |
| Total fill | 236.7225 | 100. |

EXAMPLE IV

Canned fruit cocktail
PUT IN RECIPE

| Ingredient | Weight in Grams | Percent by Weight |
|---|---|---|
| Fruit cocktail, comprising: Peaches, pitted, peeled and diced, from 30% to 50% of the total fruit; Pears, peeled, cored and diced, from 25% to 45% of the total fruit; Whole seedless grapes, from 6% to 20% of the fruit; Pineapples, peeled, cored and diced, from 6% to 16% of the fruit, and Cherries, with or without artificial color and flavor, stemmed, pitted and halved, from 2% to 6% of the fruit | 183.708 | 73.55 |
| Carboxymethylcellulose | .2028 | .0812 |
| Saccharin | .032 | .0128 |
| Sorbitol solids | 3.3075 | 1.324 |
| Water added | 62.5132 | 25.029 |
| Total fill | 249.763 | 100. |

EXAMPLE V

Canned apricots
PUT IN RECIPE

| Ingredient | Weight in Grams | Percent by Weight |
|---|---|---|
| Apricots | 178.321 | 71.96 |
| Carboxymethylcellulose | .1891 | .0763 |
| Saccharin | .0202 | .00816 |
| Sorbitol solids | 4.1337 | 1.6683 |
| Water added | 65.1145 | 26.2792 |
| Total fill | 247.779 | 100. |

EXAMPLE VI

Canned dark sweet cherries
PUT IN RECIPE

| Ingredient | Weight in Grams | Percent by Weight |
|---|---|---|
| Dark sweet cherries | 167.548 | 67.15 |
| Carboxymethylcellulose | .2298 | .0921 |
| Saccharin | .0160 | .0064 |
| Sorbitol solids | 3.3075 | 1.3250 |
| Water added | 78.3782 | 31.4166 |
| Total fill | 249.48 | 100. |

Examples II–VI inclusive may be manufactured by the procedure detailed with respect to Example I, or by any equivalent commercial process.

EXAMPLE VII

Canned apricot nectar
PUT IN RECIPE

| Ingredient | Weight in Grams | Percent by Weight |
|---|---|---|
| Unsweetened apricot nectar, comprising steamed comminuted apricots with added water | 340.20000 | 97.95918 |
| Saccharin | .0243 | .006997 |
| Sorbitol Solids | 4.96125 | 1.42857 |
| Water added | 2.12625 | .61224 |
| Total fill | 347.2875 | 100. |

The apricot nectar is heat sterilized and packed in accordance with conventional commercial practice, which is substantially equivalent to that employed in making the canned fruits of the preceding examples.

From the foregoing detailed concrete examples, and the general discussion hereinabove, persons skilled in the art will have no difficulty in preparing synergistically sweetened canned fruits and the like in accordance with the concept of the present invention.

Having thus disclosed my discovery of the synergistic sweetening co-action of saccharin and sorbitol for sweetening canned fruits without imparting any undesirable side-taste thereto, methods of preparing dietetic canned fruits sweetened with my synergistic sweetening solutions, and dietetic canned fruits resulting from the application of my improved processes embodying the concepts of the present invention, I claim:

1. Canned fruit containing of the order of about 0.01 per cent saccharin, and sorbitol in amounts from about 50 to 400 times the saccharin content.

2. Canned fruit containing from about 0.004 per cent to about 0.02 per cent saccharin, and from about 0.16 per cent to about 2 per cent added sorbitol.

3. Canned fruit comprising (a) at least one member of the group consisting of canned sliced yellow cling peaches, canned Bartlett pear halves, canned prune plums, canned fruit cocktail, canned apricots, and canned dark sweet cherries, (b) water, (c) saccharin in amount of the order of magnitude of about 0.01 per cent by weight of the total weight of said canned fruit, and (d) sorbitol solids in amount of the order of magnitude of about 100 times the weight of said saccharin.

4. Canned peaches containing about 0.013 per cent saccharin and about 1.3 per cent sorbitol solids.

5. Peaches canned with no added sugar, and containing from 0.004 per cent to 0.02 per cent saccharin, and from 50 to 400 times as much sorbitol solids as saccharin.

6. Canned pears containing about 0.01 per cent saccharin, and about 100 times as much sorbitol solids as saccharin.

7. Canned plums containing about 0.01 per cent saccharin and about 1 per cent sorbitol.

8. The method of artificially sweetening canned fruits without imparting any undesirable taste thereto, which comprises incorporating therewith from 0.004 per cent to 0.02 per cent of saccharin, and from 0.16 per cent to 2 per cent of sorbitol solids.

9. The method of artificially sweetening canned fruits without imparting any undesirable taste thereto, which comprises incorporating therewith from 0.004 per cent to 0.02 per cent saccharin, and sorbitol solids in amount from 50 to 400 times the saccharin content thereof.

10. The method of enhancing the sweetness of canned fruits sweetened with from 0.004 to 0.02% saccharin, which comprises incorporating sorbitol therewith in such amounts that the content of sorbitol solids therein is from 50 to 400 times the saccharin content thereof.

11. The method of enhancing the sweetness of canned peaches without imparting disagreeable by-taste thereto, which comprises cooking the same with a synergistic mixture of saccharin and sorbitol containing from ¾ grain to 5 grains of saccharin in each fluid ounce of sorbitol syrup.

12. Canned peaches containing about 0.013 per cent saccharin, about 1.3 per cent sorbitol solids, and about 0.1 per cent carboxymethylcellulose.

13. Canned apricot nectar containing about 0.007 per cent saccharin and about 1.4 per cent sorbitol solids.

HENRY WAYNE WALKER.

REFERENCES CITED

The following references are of record in the file of this patent:

UNITED STATES PATENTS

| Number | Name | Date |
|---|---|---|
| 851,221 | Chapin | Apr. 23, 1907 |
| 2,511,609 | Weast | June 13, 1950 |